US006209918B1

(12) United States Patent
Christopherson

(10) Patent No.: US 6,209,918 B1
(45) Date of Patent: Apr. 3, 2001

(54) SUN VISOR PRINT PRESENTATION AND COUPON DEVICE

(76) Inventor: Roth K. Christopherson, 1407 Twisted Oak Cir., Wichita, KS (US) 87230

( * ) Notice: Subject to any disclaimer, the term of this patent is extended or adjusted under 35 U.S.C. 154(b) by 0 days.

(21) Appl. No.: 09/425,645

(22) Filed: Oct. 22, 1999

Related U.S. Application Data

(60) Provisional application No. 60/105,959, filed on Oct. 29, 1998.

(51) Int. Cl.[7] .......................... G09B 19/00; B42D 15/00; G09F 21/04

(52) U.S. Cl. ............................... 283/51; 283/52; 283/56; 283/61; 40/591; 40/593; 40/643; 40/644

(58) Field of Search ................................ 283/51, 56, 52, 283/61, 62, 63.1; 281/29, 31, 45, 21.1; 40/591, 593, 643, 644

(56) References Cited

U.S. PATENT DOCUMENTS

D. 309,756 * 8/1990 Lothridge .............................. 40/584
2,181,324 * 11/1939 Glover .
2,825,988 * 3/1958 O'Reilly .
2,916,838 * 12/1959 Campbell .
2,931,114 * 4/1960 Peterson .
3,809,428 * 5/1974 Cohen ............................... 296/97 C
4,034,910 * 7/1977 Rogers .............................. 229/68 R
4,055,012 * 10/1977 Cote ................................. 40/129 C
4,305,216 * 12/1981 Skelton ................................ 40/159
4,944,971 * 7/1990 McLaughlin ........................ 428/24.9
5,099,594 * 3/1992 Reas et al. ............................ 40/593
5,112,096 * 5/1992 Keenan .............................. 296/97.6
5,340,071 * 8/1994 Fox, II ............................. 248/231.8
5,379,929 * 1/1995 Eskandry ............................ 224/312
5,446,953 * 9/1995 Lefeber .................................. 24/3.2
5,468,021 * 11/1995 Ovadia .................................. 283/56
5,516,018 * 5/1996 Eskandry ............................ 224/312
5,538,311 * 7/1996 Fusco et al. ........................... 40/658
5,640,743 * 6/1997 Greene et al. ....................... 24/10 R
5,653,364 * 8/1997 Eskandry ............................ 224/312
5,791,910 * 8/1998 Masson et al. ...................... 434/410
5,887,773 * 3/1999 Booth .................................. 224/312
5,943,805 * 8/1999 Huang .............................. 40/654.01

* cited by examiner

*Primary Examiner*—A. L. Wellington
*Assistant Examiner*—Alisa L Thurston
(74) *Attorney, Agent, or Firm*—J. Michael Neary

(57) ABSTRACT

A coupon holder and presentation article comprises a band made of a flexible sheet material, such as paper and the like, that has a first planar surface and a second planar surface. The design includes a designation on the first planar surface that will imply a fold line, score or other like specification, to divide the first planar surface into plural zones, The second planar surface will reflect similar zones as the first planar surface. The band will be printed to include information and/or photographs, drawings, illustrations, graphics, and the like, about (but not limited to) any type of product, service, special offer, discount or coupon for any type of business. The print design, when produced and in position for its designated use, will encircle a sun visor, in an adjustable manner, to fit various sizes of sun visors, to display information and/or include photographs, drawings, illustrations, graphics, and the like, about (but not limited to) products, services, special offers, discounts, tickets, game/puzzle pieces or coupons available from or for any type of business.

20 Claims, 5 Drawing Sheets

SUN VISOR PRINT PRESENTATION AND COUPON DEVICE

This application claims benefit to U.S. Provisional application No. 60/105,959 filed Oct. 28, 1998.

BACKGROUND OF THE INVENTION

This invention pertains to a print presentation and coupon article that is provided to a customer for assembly by the customer in a loop around his or her motor vehicle sun visor for ready access when the customer is deciding to make a purchase. Within the advertising industry, it is believed that most of the households in America include adults who are employed outside of the home, and if there is a married couple, frequently both spouses are so employed. The time demands of outside employment combined with ordinary demands of family and social life frequently creates pressures on the working family members. People who work all day outside of the home may leave their place of employment at 5:00 PM, for instance, and then rush to get errands done, shopping, picking up children from schools or daycare facilities. These parents may not have thought about what to prepare for dinner, and have very little or no time to prepare a meal. Research has shown that many of these parents have not given a thought about planning a family meal until late in the afternoon, perhaps 4:00 PM. At that time, or during the time between when they leave their employment and when they arrive at home, they are in the advertising industry refers to as "a decision mode" or "purchase mode". Obviously, TV advertising and most print advertising does not reach these people when they are in this "decision mode". If they are traveling in their vehicles, radio is an option which has worked fairly well, but even this form of advertising doesn't generate a significant response either since the listener frequently changes channels when a commercial starts, or people may be listening to talk shows, or a musical cassette or compact disc.

A form of advertising or product promotion has long been needed which is designed to address the issue advertisers face because of the lack of a method by which to reach consumers when they are in the "decision mode" described above. It is known that consumers respond to print pieces and coupons, but frequently coupons are not at hand in an vehicle, perhaps being stored at home on a cupboard or stuck to a refrigerator or bulletin board, or in a drawer. To be effective, the coupons must be in the hands of a consumer when they are in their car and possibly in the purchase mode or when they are planning a meal, entertainment or other items that are needed by the consumer or his or her family.

SUMMARY OF THE INVENTION

The coupon holder and presentation article of the present invention provides an easy and readily available source of business product and service promotion, advertising, coupons and discount offers which is displayed in an automotive vehicle. The information provided on the article can stimulate awareness to various types of advertisers and products or services that are available to the consumer in his or her immediate area at the time the consumer is in a purchase mode.

The presentation article of the present invention comprises a band of flexible material. The article encircles the sun visor of a motor vehicle, for instance, and thereby provides consumers with readily visible and available product information, coupons, promotions, discounts, and the like, at a time when a consumer is in his or her vehicle and would be considering or reaching a purchase decision that can be prompted, influenced or enhanced by the availability of such information. The article is designed so that the customer could instead place it around the arm rest of a passenger seat, a vehicle storage compartment lid, or secure it to other surfaces within the vehicle where the band can encircle the surface.

One embodiment of the present invention provides an article that is separated into two or more zones on a first side. One zone might include, for instance, removable coupon offers, printed discounts, special offers, or similar advertising or promotional information. A second or other zones might include maps to business, business service information, photographs, illustrations, telephone numbers for call-ahead orders, drawings, graphics, and the like which might relate to those items displayed in the first zone.

Further, on a second side of the article there can be a second surface which has multiple zones. A first zone can include an adhesive material, for the purpose of affixing the band to itself encircling the sun visor, or adhering it directly to the sun visor, and other zones which can include instructions for positioning the band on the sun visor, emergency safety instructions, or other information.

In a further embodiment of the invention, a zone can be used to affix an address label or postage information to allow postal distribution of the article to consumers.

In a further embodiment of the invention, a zone can be used to configure accommodations for door hanging of the article as a door knobe hang tab to allow easy distribution of the article to consumers.

One embodiment of the article of this invention is adjustable in size and can be attached onto a sun visor without requiring other devices or aids to hold it in place. Furthermore, the article provides a convenient location for printed materials within the motorized vehicle which are commonly needed to induce or encourage a consumer purchase decision. Thus, the article of the present invention is easily visible and accessible to the consumer and places product or service information, special discounted offers, coupons, and the like, in a convenient location, readily available and accessible, for consumers who are likely to make decisions regarding purchases while in their vehicle and further to generate awareness in the consumer's mind that he or she has immediate access to desired information in the vehicle of discounted offers, coupons, and the like.

DETAILED DESCRIPTION OF THE PREFERRED EMBODIMENTS

The coupon holder and presentation article of the present invention enables an advertiser to provide to a potential customer in their vehicles an easy and readily available source of printed business product and service promotion, advertising, coupons and discount offers. The advertising industry often refers to such printed material as a "print piece". Therefore the terms "print" and "print piece" in this text refer to such an informational or promotional article. The article of this invention is a print piece designed to fit onto a sun visor of a vehicle. The article encircles the sun visor, and is adjustably fastened in place using an adhesive substance or holding device so that a consumer can fit the print piece around any size visor. The article includes a band 2 of material that is sufficiently long to wrap around various sizes of sun visors, and has an excess of length so that the band overlaps itself and can be self-adhered in a loop around the sun visor when wrapped around the sun visor. The band 2 has preprinted "coupons" which, as used herein refer to promotional advertising that usually involves a price discount or other incentive to buy a product or use a service. Coupons are detachable or separable from the band of the coupon holder as by perforation of the band itself or by peel-off application, so that one or more coupons can be removed from the holder and presented to a merchant, for example, in exchange for discounted goods or services, while other coupons remain affixed to the band of the coupon holder for future use.

Figure 1:
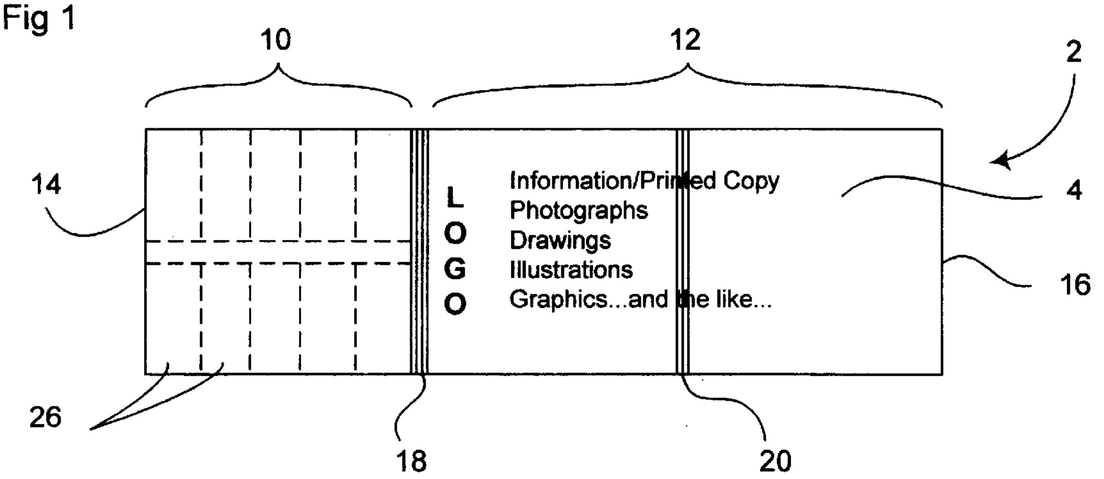
FIG. 1 is a front view of a first side of a coupon holder and presentation article incorporating features of the present invention.
Figure 10:
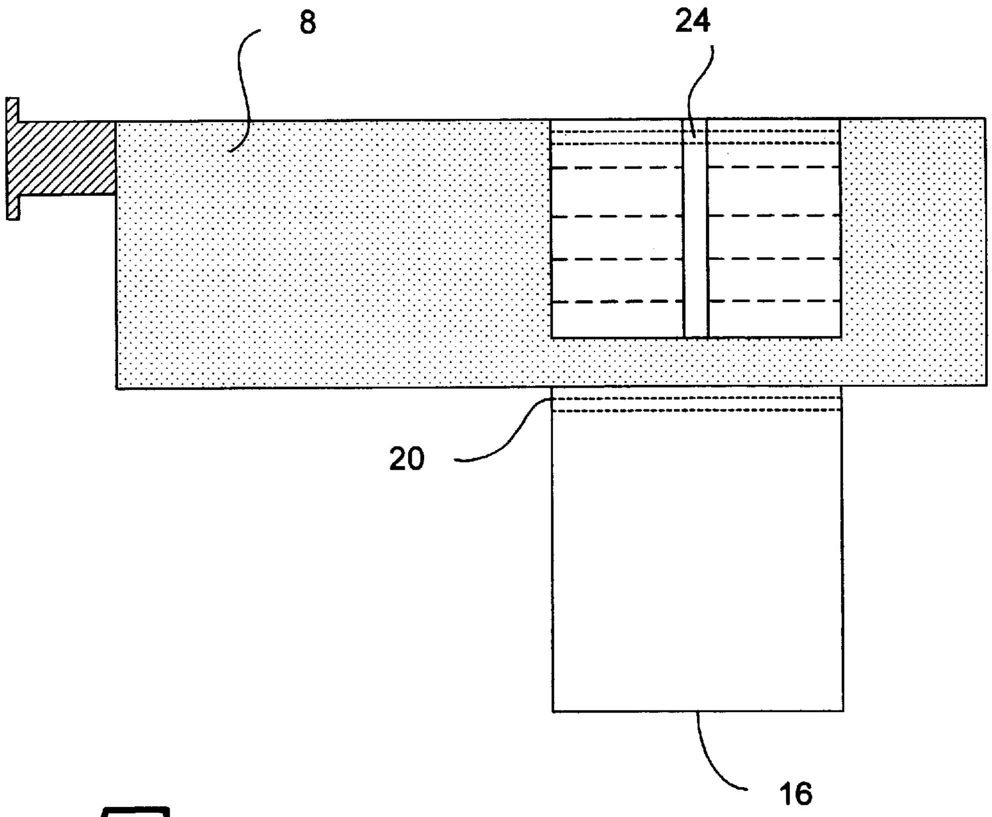
FIG. 10 is a front view of an article in accordance with this invention positioned on a sun visor before attaching, showing the sun visor in a lowered position.
Figure 15:
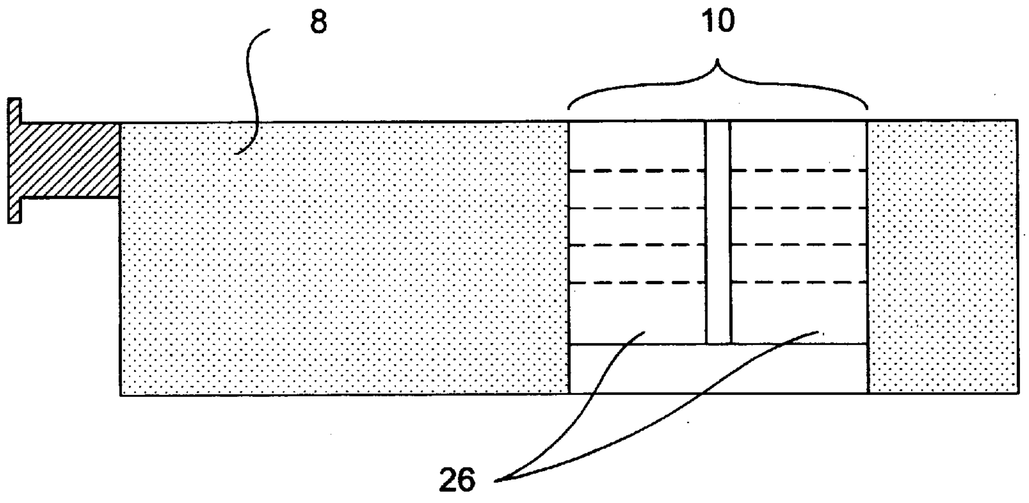
FIG. 15 is a front view of an article positioned on a sun visor after attaching with the sun visor in the down position.
Figure 16:
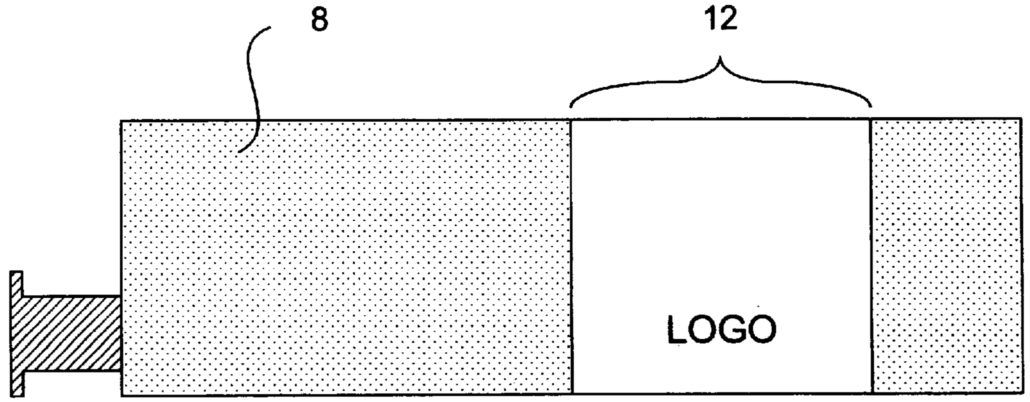
FIG. 16 is a front view of an article on a sun visor after attaching with the sun visor in the up position.

As shown in FIG. 1, the coupon holder and presentation article has a band 2 of stiff and flexible material having a has a first planar surface 4 which can be dedicated to the presentation of information about one or more advertiser's products or services and which can be separated into two or more zones 10, 12. The first planar surface 4 of the band 2 is the outside of the article and will be visible when the band is wrapped around the a sun visor 8 in either its down position as shown in FIGS. 10 and 15 or in its up position as shown in FIG. 16. The first surface 4 has a first zone 10 which may include, for example, attached removable coupons 26. A second zone 12 can include printed material such as information, photographs, drawings, maps, illustrations, graphics and the like about products, services, special offers, business locations or the like relating to those coupon items which may be contained on the first zone 10. Obviously, these zones could be interchangeable in that coupons could be mounted so as to be visible to the consumer when the visor was in an up position or visible when the visor is in a down position.

Figure 2:
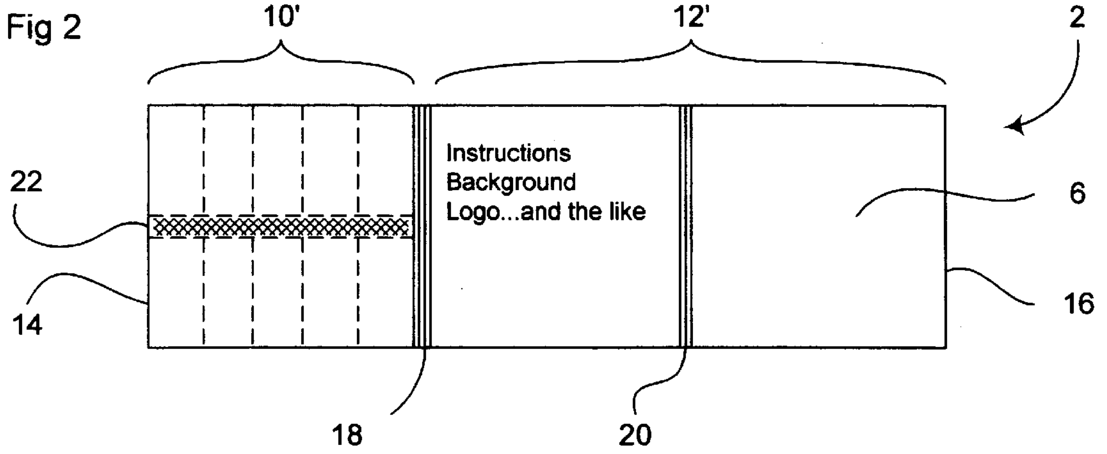
FIG. 2 is a back view of the first side of the article of FIG. 1.
Figure 5:
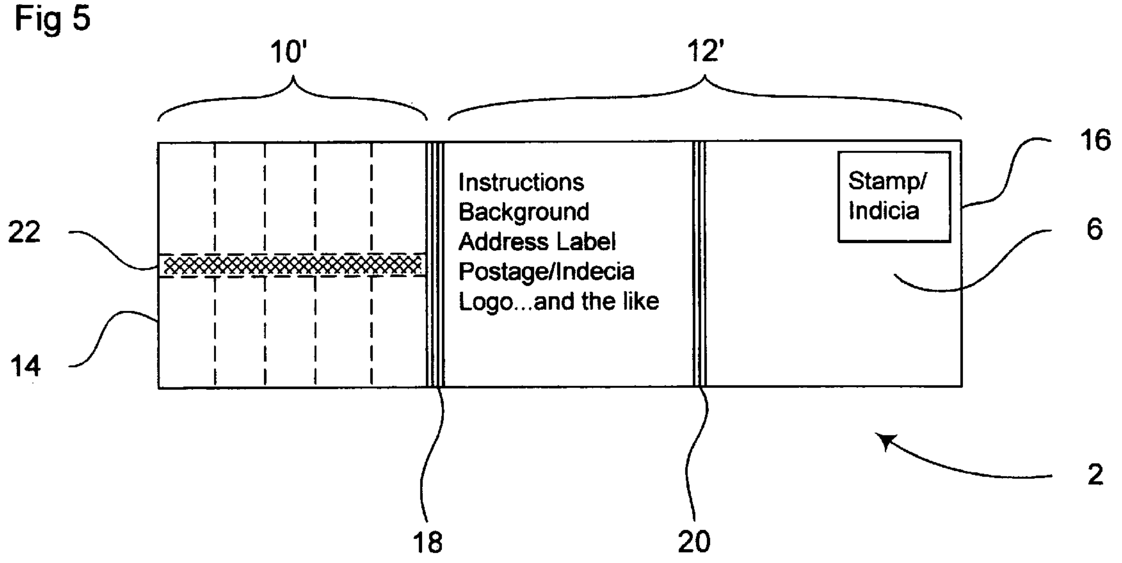
FIG. 5 is a back view of the first side of a further embodiment of the present invention incorporating a mailer.
Figure 6:
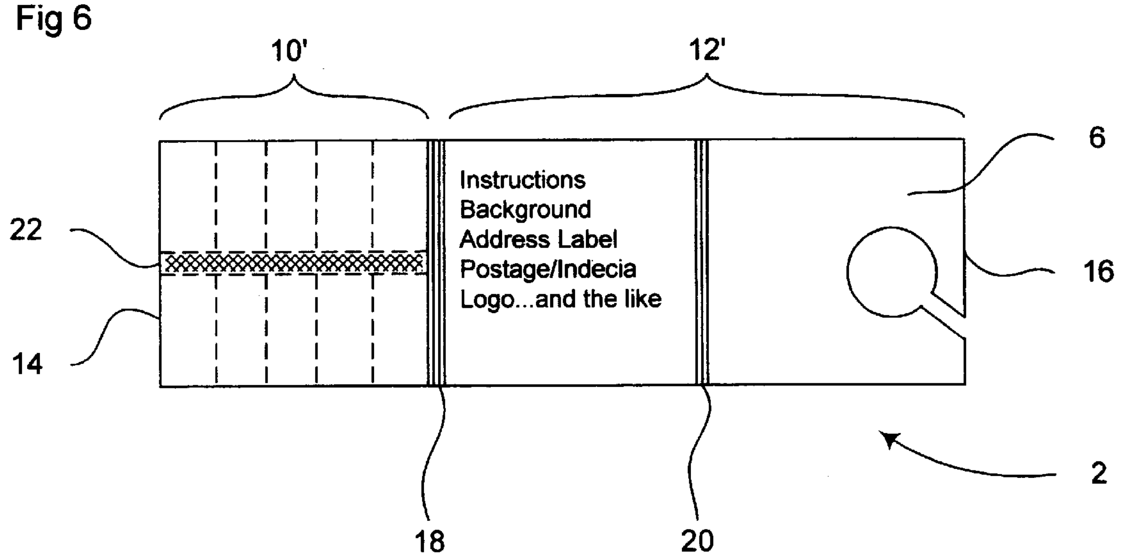
FIG. 6 is a back view of the first side of a further embodiment of the present invention incorporating a door hanger.

As shown in FIGS. 2, 5 and 6, a second planar surface 6 of the band 2 will be the inside surface of the band when it is wrapped around the sun visor 8 and will have most of its surface against sun visor 8 after mounting and therefore out of view of the user. The second surface 6 can also have two or more zones 10', 12' and may include, for instance, instructions for positioning the piece around the sun visor. Additionally, the second side 6 allows space for mailing or delivery addresses, or as shown in FIG. 6, for accommodating a door hanger, or any combination of these things.

The band 2 is made of flexible sheet material such as heavy, durable paper or cardboard, fabrics, leather, flexible plastics, thin foils and the like, which can be given to a consumer for mounting by the consumer on the sun visor of a motor vehicle for convenient access. When band 2 is made from a more durable material than, for instance, paper, it is possible to reuse band 2 by supplying a consumer with a single band and multiple books of coupons.

Figure 3:
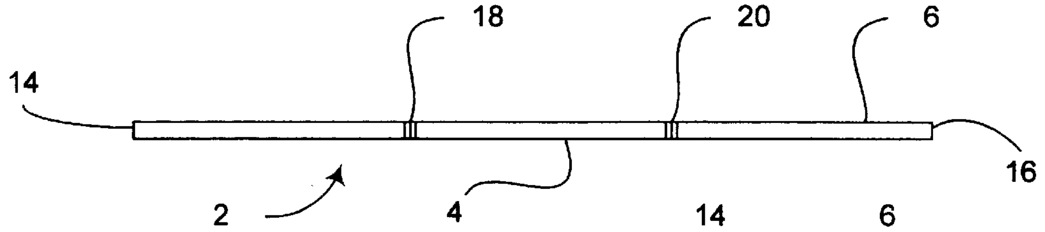
FIG. 3 is a side edge view of the article of FIG. 1.
Figure 4:
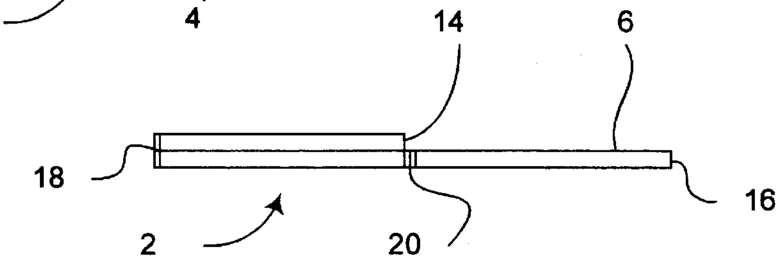
FIG. 4 is a side edge view of the article of FIG. 1 with one end folded over.
Figure 11:
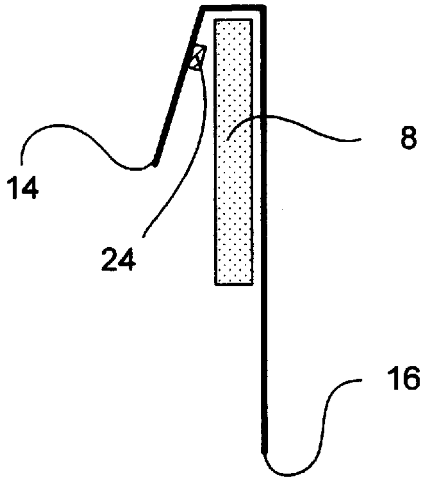
FIG. 11 is a side edge view of an article and sun visor shown in FIG. 10.
Figure 12:
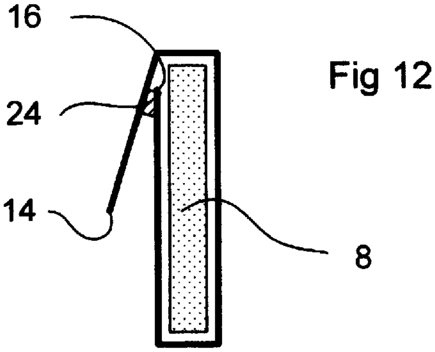
FIG. 12 is a side edge view of an article as shown in FIG. 10 which has been further folded around a sun visor.
Figure 13:
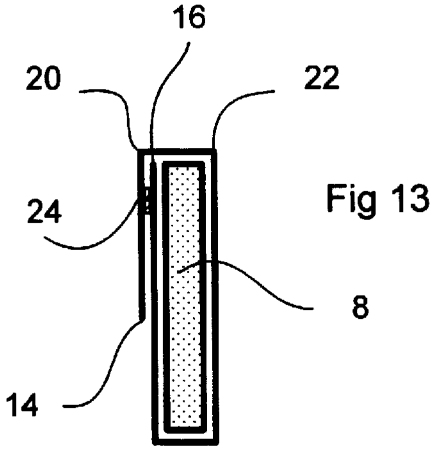
FIG. 13 is a side edge view of an article as shown in FIG. 10 after attachment to the sun visor.

Each band 2 has a first end 14 and a second end 16. As shown in FIGS. 1–6 and 10, one or two sets of one or several closely spaced parallel fold line designations 18, 20 such as marked dashes, scores, perforations and the like can be printed or embossed into the band on either or both planar surfaces 4, 6 to allow a single size band to fit various sizes or models of sun visors. Thus, as shown in FIGS. 3 and 4, the first end 14 of the band can be folded along any one or more of the fold lines in the first set 18 towards the center of the article. Likewise, second end 16 can be folded along any one or more of the fold lines in the second set 20. As best shown in FIGS. 11–13, when the band is in its proper fixed position around sun visor 8, the first end will be long enough to overlap the second end of the band 2. The second end can then be fastened to first end on the second surface 6 of the band. In this manner, the folded band acquires a radius of curvature around the visor that approximates the radius of curvature of the edge of the visor.

The band 2 can incorporate any one or more of several means for fastening the second end 16 to the first end 14 and for holding the band securely on the sun visor 8. FIGS. 2 and 5–6 show a longitudinal adhesive strip 22 extending between the coupons 26 on the second surface 6 which is used to affix the second end 16 to the first end 14. In addition to or in place of the adhesive strips, the fastening means 22 could also include pressure sensitive adhesive, moisture activated strips, band extension straps, slots and tabs, hook and loop fastening material, an elasticized material or string, or by affixing the band 2 to the sun visor 8 by sliding the band 2 through a strap that may already be part of the sun visor based on manufacturer design features on the various types of sun visors. As shown in FIGS. 11–13, a transverse adhesive strip 24 to hold the ends of the band together can also be used. This transverse strip could be affixed to the second surface 6 near first end 14, as shown, or on the first surface 4 near the second end 16 or in similar combinations wherein one end can overlap the other end and seal the band tightly in place on visor. The band does not require outside assistance or holding devices to be affixed to a visor. After fastening, a consumer can slide the band on and off the visor, as desired. However, the band can also be supplied with secondary holding means which are intended to contact the visor, such as a strip of hook or adhesive material, and preferably material that is easily releasable. For instance, the adhesive strip 24 could be extended sufficiently to contact no only the second end 16 of band 2 but also contact the surface of visor 8. The secondary holding means would prevent the band from turning or sliding due to vibrations of the vehicle or to the weight of the coupon strips or for other reasons. Obviously, the band of the present invention can also provide for positioning the band on another feature in the vehicle, such as a dash, a glove compartment door, or other manufacturer drawer or slot-type compartments located on a dash, floor, seat or door. This type of band would include a means for holding the band tightly onto the chosen location.

Figure 7:
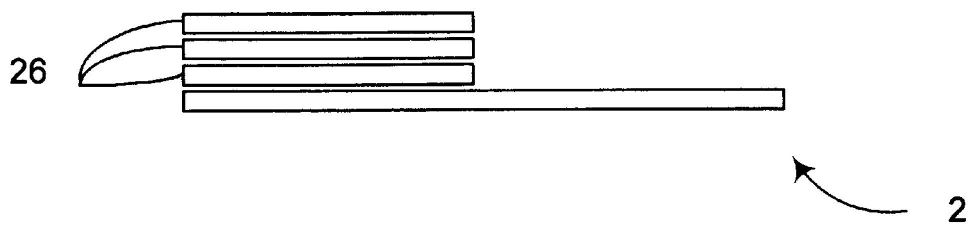
FIG. 7 is a side edge view of another embodiment of this invention including a plurality of coupon zones incorporating features of the present invention.

Coupons 26 can be presented singly or in strips as shown in FIG. 1–2 and 5–6. As shown in FIG. 7, coupons or strips of coupons can be presented in multiple layers. When presented in strips, coupons are perforated along their edges to make each coupon individually easily removable without destroying the integrity of band 2 mounted to visor 8 or the integrity of any remaining coupons. Coupons would be a single thickness of material with perforated edges to allow disengagement from the coupon strip. Coupons could also be a pull-tab arrangement where a single coupon is peeled from a backing material, and the backing material remains on the band after the coupon is removed.

Figure 8:
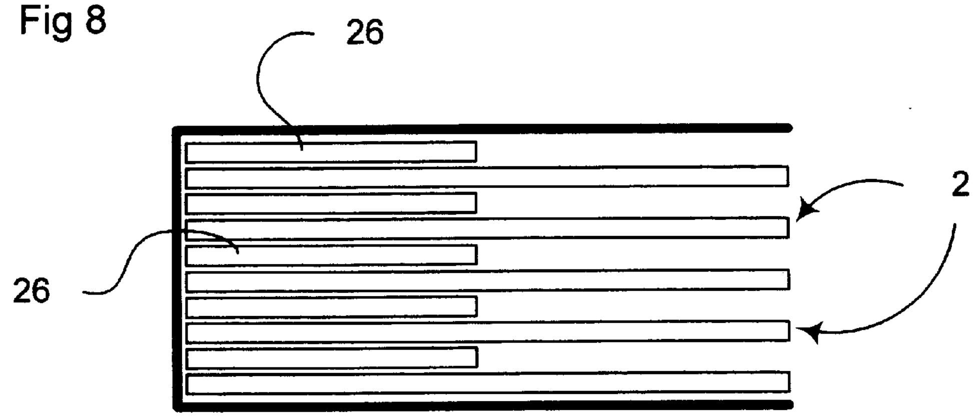
FIG. 8 is a side edge view of an article in booklet form containing a plurality of bands incorporating features of the present invention.
Figure 9:
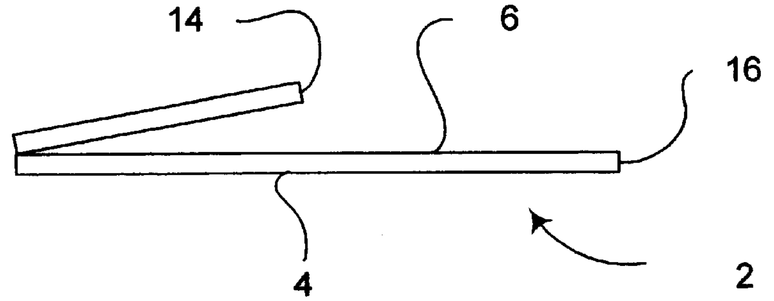
FIG. 9 is a side edge view of an article with one end partially folded over.
Figure 14:
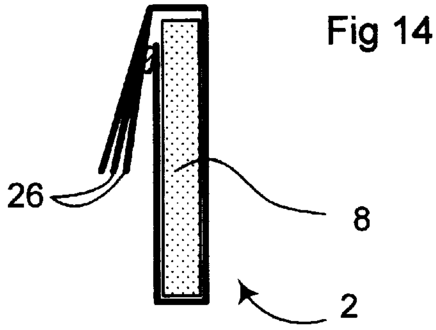
FIG. 14 is a side edge view of an article with a plurality of coupon zones and with the sun visor in the down position.

Each strip of coupons 26 could be represented by a single or multiple advertisers. Coupons can be made available to consumers through a single booklet that contains multiple strips of coupons, as shown in FIGS. 7 and 14, or in a single package of multiple bands, as shown in FIG. 8. Each band could be represented by a single advertiser. Multiple bands would be affixed into a single package whereby consumers would receive numerous advertising options. The consumer can then select the bands with the coupons that most appeal to their needs. Each band can be targeted to a particular audience. For example, for women, advertisements and coupons including food, laundry/dry cleaners, hair and/or nail products and services and the like would be represented. For teenagers, who also drive, bands could include, for example, foods, activities at youth centers, movie rentals, amusement facilities, and the like. Thus a single package of multiple bands would provide print pieces for every member of a family. The bands most representing likes of an individual member of a family can be removed from the booklet and used independently in that family member's car.

FIG. 15 shows an band 2 wrapped around the sun visor in its final position with coupons 26 in first zone 10 facing the consumer, and the visor 8 in the down position.

FIG. 16 shows is an band 2 wrapped around the visor 8 in its final position with the second zone 12 facing the consumer, and the visor in the up position.

What is claimed is:

1. A consumable coupon holder and presentation article for mounting on a vehicle sun visor, comprising:

a band of flexible sheet material having a first planar surface having first and second zones, said first zone being printed with a plurality of coupons printed thereon;

delineations around said coupons to facilitate removal of said coupons individually from said first zone;

fold line designations, actual or implied, on said band between said first zone and said second zone; and means for holding said band in a loop around said sun visor.

2. A coupon holder and presentation article as defined in claim 1, wherein said flexible sheet material is heavy, durable paper.

3. A coupon holder and presentation article as defined in claim 1, wherein said band of material is pre-scored along said fold line designations to facilitate folding around said sun visor.

4. A coupon holder and presentation article as defined in claim 3, wherein said pre-scored or fold line designations that enable said band to encircle a thick sun visor with a radius of curvature approximating the radius of curvature of the edge of said sun visor.

5. A coupon holder and presentation article as defined in claim 1, wherein:

said coupons are individually perforated therearound to facilitate removal thereof from said band; and there are multiple coupon zones included in the holder and presentation article.

6. A coupon holder and presentation article as defined in claim 1, wherein said loop holding means includes a strip or strips of pressure sensitive adhesive, moisture activated substance on said band in a position to hold said band in a loop around said sun visor when said band is wrapped there around, and overlapping zones thereof are pressed together.

7. A coupon holder and presentation article as defined in claim 6, wherein said strip or strips of pressure sensitive adhesive, moisture activated substance lies along an axial region between two sets of coupons, disposed on opposite lateral sides of said band of material.

8. A coupon holder and presentation article as defined in claim 1; wherein said loop holding means includes hook and loop fasteners adhesive on said band in a position to hold said band in a loop around said sun visor when said band is wrapped there around, and overlapping zones thereof are pressed together.

9. A coupon holder and presentation article as defined in claim 1, wherein said loop holding means includes an elastic band or string.

10. A consumable coupon holder and presentation article for mounting on a sun visor or similar part in an automotive vehicle, comprising:

a band of flexible sheet material have a first planar surface and a second planar surface, said first planar surface having first and second zones, said first zone being printed with one or more coupons, each of said coupons being defined by a series of delineations that facilitate easy disengagement of each coupon individually from said band in said first zone;

said band having at least one transverse fold or fold line on said first planar surface to facilitate wrapping said band around said sun visor, said band further having a first end and a second end, and means for fastening said second end of said band to said second planar surface, wherein said band is folded along said transverse fold line and said second end of said band extends beyond said first end between said visor and said second planar surface, and said second end is fastened to said second planar surface so that said band encircles said visor.

11. The coupon holder article of claim 10 where said means for fastening on said first end of said article is one or more slots and where said means for fastening said second end is one or more tabs wherein at least one tab would engage one slot to secure said article to said visor.

12. The coupon holder article of claim 10, wherein:

each of said coupon delineations including a series of perforations to allow each coupon to be releasably disengaged from any other coupons in said first zone.

13. A method of presenting coupons to a customer at a time and place where said customer is making purchasing decisions in a place other than a residence or place of business, to promote a product, comprising:

selecting a band of flexible sheet material having a first zone and a second zone, at least one coupon printed in said first zone on said band and being folded or having fold lines inscribed on said band between said first zone and said second zone; said band being perforated around each of said coupons individually to facilitate their removal by said customer;

said band having applied thereon a means for holding said band in a loop around a sun visor in a position that will hold said band in a loop when wrapped around a motor vehicle sun visor;

delivering said band to said customer with instructions for mounting said band in a loop around a sun visor of a motor vehicle, using said holding means to releasably secure said band around said sun visor where said coupons will be conveniently at hand;

whereby said customer can mount said band on said sun visor of his motor vehicle and will thereby be presented while in his vehicle with coupons that promote a product when said customer is in his vehicle.

14. A consumable coupon holder and presentation article as defined in claim 1, wherein:

said coupon delineations include perforations in said flexible sheet material that facilitate ripping said coupon out of said band.

15. A consumable coupon holder and presentation article as defined in claim 1, further comprising:

instructions printed on said second planar surface of said band for mounting said band in a loop around said sun visor of a motor.

16. A coupon holder and presentation article as defined in claim 10, wherein:

said means for fastening said second end of said band to said second planar surface includes a pressure sensitive adhesive on said band in a position to hold said band in a loop around said sun visor when said band is wrapped therearound, and overlapping zones thereof are pressed together.

17. A coupon holder and presentation article as defined in claim 16, wherein:

said pressure sensitive adhesive lies along an axial region between two sets of coupons, disposed on opposite lateral sides of said band of material.

18. A method as defined in claim 13, wherein:

said means for holding said band in a loop around said sun visor includes a pressure sensitive, releasable adhesive.

19. A method as defined in claim 18, wherein:

said coupons are arranged in two sets on opposite sides of a central axial region between said two sets of coupons; and said strip of pressure sensitive adhesive lies in said central axial region between said two sets of coupons.

20. A method as defined in claim 13, wherein:

said flexible sheet is paper.

* * * * *